(12) United States Patent
Benzel

(10) Patent No.: US 11,184,561 B2
(45) Date of Patent: Nov. 23, 2021

(54) METHOD FOR IMPROVED ACQUISITION OF IMAGES FOR PHOTOGRAMMETRY

(71) Applicant: Aaron M. Benzel, Houston, TX (US)

(72) Inventor: Aaron M. Benzel, Houston, TX (US)

( * ) Notice: Subject to any disclaimer, the term of this patent is extended or adjusted under 35 U.S.C. 154(b) by 173 days.

(21) Appl. No.: 16/237,440

(22) Filed: Dec. 31, 2018

(65) Prior Publication Data

US 2020/0213535 A1 Jul. 2, 2020

(51) Int. Cl.
| | |
|---|---|
| *H04N 5/33* | (2006.01) |
| *G06T 5/50* | (2006.01) |
| *G06T 17/10* | (2006.01) |
| *G06T 15/04* | (2011.01) |
| *G06T 5/00* | (2006.01) |
| *G01C 11/02* | (2006.01) |

(52) U.S. Cl.
CPC ............ *H04N 5/33* (2013.01); *G01C 11/02* (2013.01); *G06T 5/009* (2013.01); *G06T 5/50* (2013.01); *G06T 15/04* (2013.01); *G06T 17/10* (2013.01); *G06T 2207/10004* (2013.01); *G06T 2207/10048* (2013.01); *G06T 2207/10144* (2013.01); *G06T 2207/10148* (2013.01); *G06T 2207/20208* (2013.01); *G06T 2207/20221* (2013.01)

(58) Field of Classification Search
CPC ...................................................... H04N 5/33
USPC ........................................................ 348/164
See application file for complete search history.

(56) References Cited

U.S. PATENT DOCUMENTS

| | | | |
|---|---|---|---|
| 7,643,025 B2 | 1/2010 | Lange | |
| 8,837,855 B2 | 9/2014 | Relyea et al. | |
| 9,854,155 B1 * | 12/2017 | Sikka | G02B 7/09 |
| 2014/0267378 A1 * | 9/2014 | Olsen | G06T 5/40 |
| | | | 345/617 |
| 2015/0279012 A1 * | 10/2015 | Brown | G06T 5/50 |
| | | | 382/284 |
| 2017/0363741 A1 * | 12/2017 | Send | G01S 17/46 |

OTHER PUBLICATIONS

Galantucci, L.M., et al., "Multistack Close Range Photogrammetry for Low Cost Submillimeter Metrology", Journal of Computing and Information Science in Engineering, vol. 13, Issue 4, Dec. 2013, pp. 044501-1 to 044501-4.

* cited by examiner

*Primary Examiner* — Daniel T Tekle
(74) *Attorney, Agent, or Firm* — SMU Law School Patent Clinic

(57) ABSTRACT

A method for improved image acquisition for photogrammetry includes focusing a camera on one end of an object, capturing one or more images of the object, incrementally adjusting the focal length of the camera toward the opposite end of the object, and capturing images at each new focal length. Once the object has been photographed at varying focal lengths that run the entire length of the object, the multitude of images are then combined using focus stacking to create a singular image that is more in focus for the entire length of the object. A method for utilizing thermographic cameras to aid in the acquisition of images for photogrammetry includes applying thermal textures to the object and isolating an object from the background due to thermal differences.

20 Claims, 9 Drawing Sheets

METHOD FOR IMPROVED ACQUISITION OF IMAGES FOR PHOTOGRAMMETRY

TECHNICAL FIELD

This disclosure relates in general to the field of image acquisition, and more particularly to a method for improved acquisition of images for photogrammetric modeling.

BACKGROUND

Photogrammetric modeling is the process of building digital three-dimensional models from two-dimensional images or photographs. The accuracy of a three-dimensional photogrammetric model is directly related to the quality of the images input into the photogrammetric modeling processes. A low quality or out of focus image will result in a low quality and potentially distorted three-dimensional model. Photogrammetric modeling functions by identifying common surface points within two or more images, then triangulating the distance between each set of two surface points, and, thereby, determining a three-dimensional coordinate position of each of the surface points. The resulting array of surface points are then compiled to form a three-dimensional digital mesh that represents the object of the imagery. The more surface points that the process can identify and triangulate between images, the more detailed and accurate the resulting three-dimensional model of the object of the imagery.

While photogrammetry can be very effective for creating three-dimensional models of objects, the process has several limiting disadvantages. First, it can be difficult to capture an image of the object in which the entire object is in focus. This problem is especially apparent in micro, macro, and close-range photography. Second, cameras are limited in the range of luminosity that they can capture in a single image. This limitation in the luminosity range results in a loss of clarity and distinction between pixels as some parts of the image will be lighter or darker than the other. Third, photogrammetric modeling of objects with transparent or reflective surfaces can be difficult and inaccurate. Traditional photography struggles to capture the requisite detail of such objects to allow the photogrammetric modeling software to work. Finally, there can often be difficulties in differentiating the object to be modeled from the background. This difficulty in isolating background image data can result in distorted or low-quality models with anomalies as the photogrammetric modeling process may attempt to use pixels of the background in determining the geometry of the object.

SUMMARY

The present disclosure related to various methods for improved acquisition of two-dimensional, photographic images for photogrammetry that address one or more of the problems and disadvantages associated with previous methods.

In accordance with one respective implementation of one method, one of the camera or the object the user wishes to model is positioned in the field of view of a camera. The focal length of the camera is then adjusted so that one end of the object is in focus. With this focus setting one or more images are captured of the object. Then incrementally adjusting the focal length of the camera toward an opposite end of the object and capturing one or more images of the object at each incremental focal length until the focal length reaches the opposite end of the object. At this point, the camera or the object is repositioned to provide another perspective of the object. The process of capturing images at various focal lengths is repeated until the object has been photographed along its entire length. The above steps are then repeated until one or more images have been captured at each perspective and focal length to provide a comprehensive set of images representing the object in its entirety. Finally, from this comprehensive set of images a focused image of the object at each perspective is generated.

In particular implementations, this process can also be combined with high dynamic range photography to allow for various luminosity ranges to be captured at each perspective. This in turn would result in an image of the object that is more in focus and has a wider range of luminosity (compared to traditional methods) for a given perspective. Utilizing this method, with or without high dynamic range photography, allows for superior photogrammetric modeling of micro, macro, and close-range photography as it helps to overcome the difficulty in capturing an image of the entire object that is in focus. In addition, by utilizing high dynamic range in conjunction with the disclosed focus stacking method, the traditional luminosity limitations on cameras can also be overcome, resulting in superior images for photogrammetric modeling.

In accordance with an implementation of another method one of the camera or the object the user wishes to model is positioned in the field of view of a thermographic camera. A temperature differential is then applied to the object in a patterned manner. The thermographic camera is then used to capture one or more thermographic images of the thermal pattern on the object. The object or the camera is then repositioned to allow for a new perspective of the object to be captured. Thermographic images are then captured of the patterned temperature differential on the object from the new perspective while continuing to create the patterned temperature differential. The process is then repeated until a comprehensive set of thermographic images to represent the object in its entirety has been captured. This plurality of thermographic images can then be used to create a photogrammetric model of the object. The photogrammetric modeling utilizes the thermal pattern to create the three-dimensional model of the object. This method is particularly useful for modelling highly reflective or transparent object.

In another implementation of this method, a visible light camera is also used to capture visible light images of the object from the same perspectives as the thermal camera. A thermographic mesh is then created from the comprehensive set of thermographic images. As a result, the visible light images can then be used to project the texturing of the object on the thermographic mesh created from the captured thermographic images. Utilizing a thermographic camera to capture images of a patterned temperature differential on an object allows for improved photogrammetric modeling of more complex objects or objects that have reflective or transparent surfaces as compared to traditional photogrammetric image capturing techniques, which have difficulties in capturing images of such objects with sufficient detail and differentiation.

In accordance with another implementation of the method one of the camera or the object the user wishes to model is positioned in the field of view of a thermographic camera and one or more thermographic images of that subject and the background are captured. By utilizing a measurable temperature difference between the subject and background, the subject can be isolated from the background by creating an image mask of the subject from the thermal difference.

In yet other implementations, a temperature differential between the subject and the background is applied to either the subject or the background. The subject may have a different temperature than the background naturally given the characteristics of the object, but it may be necessary to either warm or cool the background or the object either physically or through non-physical heat sources. In addition, in some implementations, a visible light camera is positioned in the same perspective as the thermographic camera and is used to capture visible light images of the subject. The thermal image mask can then be applied to the visible light images to isolate the subject from the background, resulting in an isolated image, thus removing image anomalies that may affect the model if the subject were not isolated. Utilizing thermal differences and thermal image masks also avoids the color limitations of conventional chroma key isolation methods that are often used.

BRIEF DESCRIPTION OF THE DRAWINGS

For a more complete understanding of the present disclosure and its advantages, reference is now made to the following description and the accompanying drawings, in which.

DETAILED DESCRIPTION

In the following descriptions, like numbers refer to like elements.

The present disclosure will now be described in detail with reference to the Figures.

Figure 1:
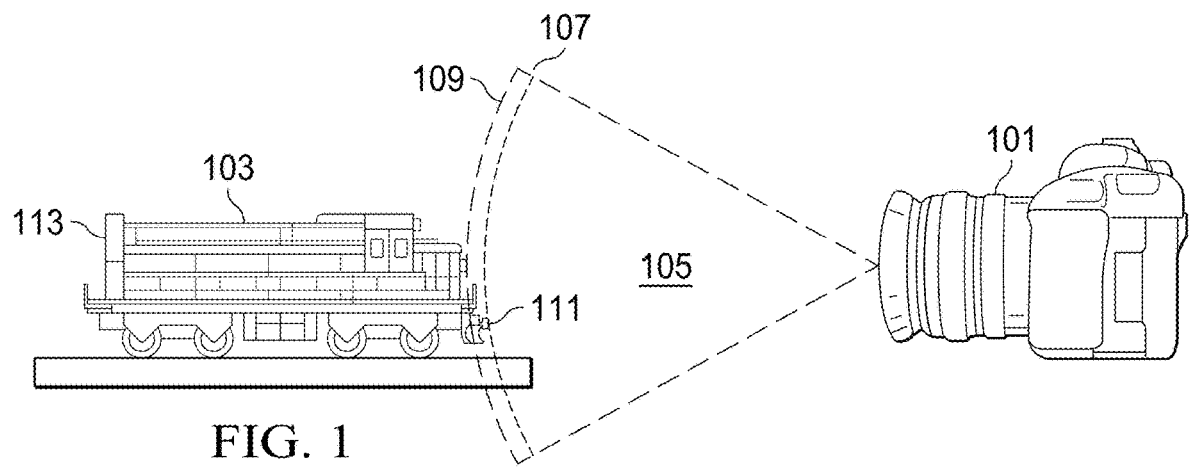
FIG. 1 illustrates an overview of one exemplary implementation of a focus stacking method with a camera and a target object.

Referring now to FIG. 1, a three-dimensional object 103 is placed in the field of view 105 of a camera 101. The object 103 could be placed or manipulated through any means such as manually by hand or by a machine. The object 103 could be anything of interest and have any size and shape. The object 103 in this exemplary implementation is a microscale object, such as a toy or model train car, for example. When dealing with micro-scale objects, it can be hard to attain a single picture of the micro-scale object that has the entire object 103 in focus. The object 103 could, instead, be a macro-scale object such as a building, in which case the camera 101 may be mounted on some specific vantage point or be attached to some sort of aerial vehicle. The camera 101 could be any sort of visible light camera. For example, the camera could be a digital single lens reflex camera (DSLR), a digital camera, a video camcorder, a webcam, a smart phone, or other known means of capturing digital images.

In FIG. 1, the camera 101 is set to a first focal length 107, which is aligned with the near edge 111 of the object 103. At this first focal length 107 one or more images are captured by the camera 101. Once the images have been captured, then the first focal length 107 is adjusted to a second focal length 109, which is incrementally closer to the far edge 113 of the object 103. The incremental increase shown between the first focal length 107 and the second focal length 109 is merely representative and the amount of adjustment depends on what is required to achieve the next level of focus for the particular object 103. At each focal length, the camera 101 captures images of the object 103 until the entire object 103 has been photographed with focal lengths ranging from the near edge 111 to the far edge 113. This process could also be performed in the reverse with the first focal length 107 starting at the far edge 113 and then incrementally changing the focal length to end at the near edge 111. This process could also be performed by starting the first focal length 107 anywhere along the object 103 and then changing the focal length toward either the near edge 111 or the far edge 113, so long as the entire length of the object 103 is photographed at the requisite focus.

Figure 2:
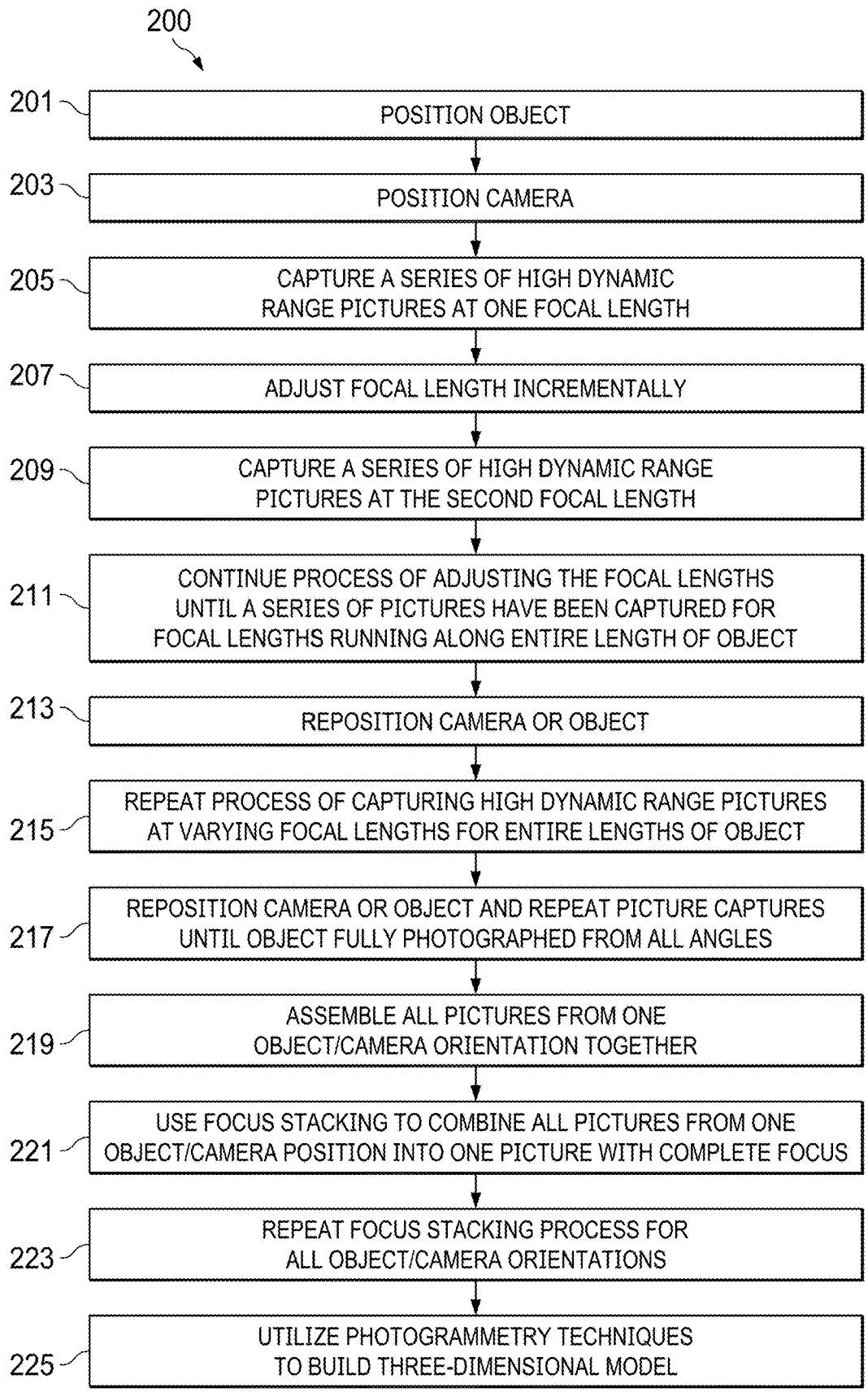
FIG. 2 is an exemplary flowchart of an alternative method for acquiring images for photogrammetric modelling.

FIG. 2 depicts an exemplary flowchart of an alternate method 200 for acquiring images for photogrammetric modelling. The method 200 begins with step 201, where an object is positioned. The object could be anything and of almost any size. In step 203, a camera is positioned such that the object is in the field of view of the camera. The purpose of step 201 and step 203 is to position the object within the field of view of the camera. As mentioned above the camera is one sensitive to visible light that captures and stores digital images. In step 205, a series of images are captured at a first focal length, which generally would be located at one end of the object. The images in step 205 are high dynamic range images, meaning that a series of images are captured at various exposure settings at that first focal length. It is not necessary, however, that high dynamic range photographs be taken at every focal length. The high dynamic range photographs can be taken at whatever focal length is desired, but they are most useful when images taken of the object at any exposure would have portions that are lighter, darker, or both, that would tend to skew the resulting photogrammetric model. This may occur because of, for example, the coloring of the object.

High dynamic range photography is a process that can be utilized to create an image of an object that possess a larger range of luminosity for the entire object. The process involves the capturing of multiple images from the same location and at the same focus setting with varying exposure settings. This in turn ensures that at each location and focus setting each portion of an object is imaged at the substantially optimal exposure setting. The multitude of photos are then combined such that the resulting image has the larger range of luminosity values for each portion of the object. The photo can then be processed to create a singular image file wherein each portion of the object possesses its substantially optimal luminosity. This processing is accomplished through the use of a computer utilizing the requisite processing. The use of high dynamic range photography helps to ensure that the object is more clearly illuminated, which in turn aids in creating a more detailed and accurate photogrammetric model. The application of high dynamic range photography in acquiring images for photogrammetry is particularly useful when an object's coloring could potentially introduce exceptionally dark or light areas, which may distort the resulting model.

In step 207, the focal length of the camera is adjusted in a predetermined increment towards an end of the object. At this new focal length, in step 209, a new series of photos are taken. Again, these photos may be high dynamic range photos or not as needed. The process of incrementally changing the focal length (the increments need not be equal) and taking a series of photos is repeated in step 211, until photos have been captured along the entire length of the object. The result is a series of images that collectively have most if not all portions visible and in sufficient focus. In step 213, the camera or the object is repositioned so as to allow the capturing of a new perspective of the object. Whether it is the object or the camera that is repositioned depends on what is easiest. For a small object perhaps repositioning the object is easier, but if the object is a building then the camera is far easier to relocate. From this new perspective, the above process of taking photos at varying focal lengths is repeated in step 215. The process of repositioning the camera or object and taking photographs at incremental focal lengths is repeated for all the necessary angles in step 217 until a multitude of images have been captured at all necessary or desired perspectives, focal lengths, and exposure settings. In step 219, the batch of images of the object for a given perspective are then combined.

The resulting combination of images is processed, in step 221, through focus stacking and, if utilized, high dynamic range photography methods. Focus stacking or focal length merging is a process that can be utilized to create an image of an object that is more in focus across its entire depth as compared to traditional methods. Focus stacking is particularly relevant and useful when dealing with objects that are either very small or very large, when it is difficult to capture a single image of the object that is fully in focus. The process of focus stacking comprises the taking of two or more of images at varying focal lengths along the depth of the object. The images are then compared and processed to select the sharpest pixels of each image. This processing is generally done through the use of a computer running focus stacking algorithms. The result of the focus stacking process is a singular image where most if not all portions of the object are "in focus." With an image of an object in better focus along each point of the object (as compared to a single image in which only a portion of the object will be in focus), a more accurate and detailed photogrammetric model can be created. In addition, this method aids in the acquisition and modelling of objects on the micro, macro, and close-range scale. Thus, the implementation of this method helps to overcome some previous limitations on photogrammetric modelling.

The result of this focus stacking process is a single image for a given perspective that is more in focus than traditional photo acquisition methods, which do not utilize focus stacking. In step 223, the focus stacking and high dynamic range processing is repeated for all the perspectives. The result is a series of images that fully resemble the object from all necessary perspectives and that each possess a wider range of luminosity and are more in focus as compared to traditional methods. From these images then, photogrammetric modelling can be performed to create a three-dimensional model, in step 225. By utilizing focus stacking and high dynamic range photography in this manner, then the depth of field and narrow luminosity range limitations of traditional photogrammetry image acquisition can be overcome. The result is a model that has far superior detail and accuracy. In addition, it allows for photogrammetry to be performed well on objects that previously were thought not ideal, such as on micro-scale objects.

Figure 3:
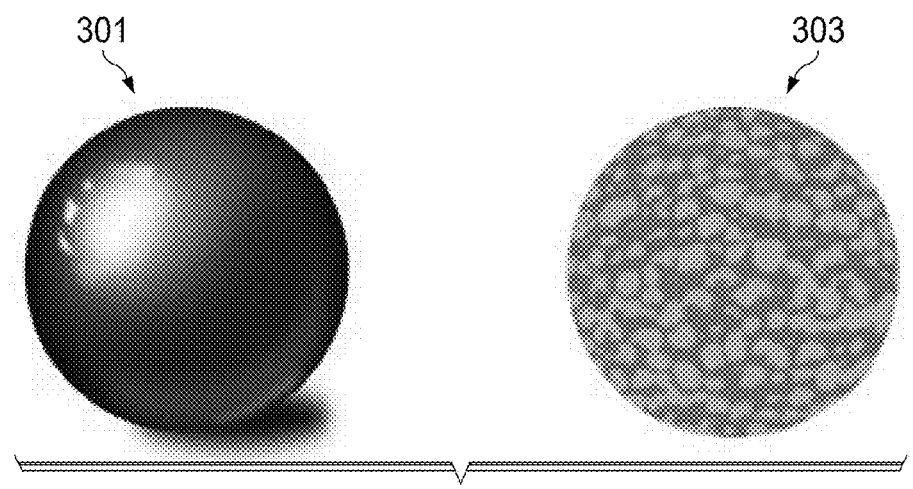
FIG. 3 is an exemplary illustration of an object patterned with a thermal differentiation.
Figure 4:
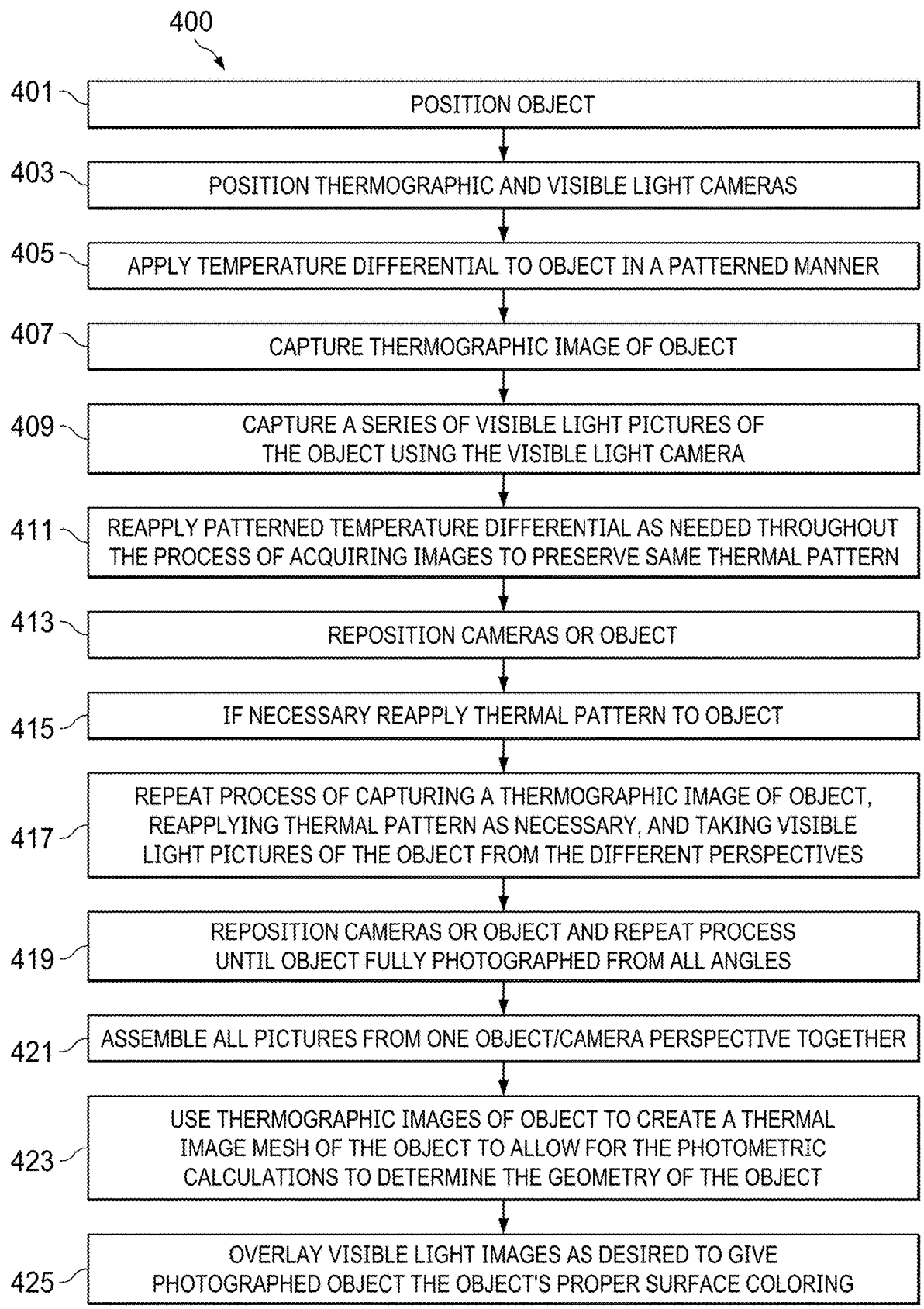
FIG. 4 is a flowchart of an exemplary process using thermographic texturing to acquire images for photogrammetric modelling.

FIG. 3 is an exemplary illustration of an object 301 that has been patterned with a thermal differentiation to allow for thermographic texturing to be used to create a photogrammetric three-dimensional model. FIG. 3 shows an object 301 on the left and a thermal pattern 303 of the object 301 on the right. The object 301 in this exemplary implementation is a sphere with a highly reflective surface. Under traditional photogrammetric image acquisition processes this highly reflective surface would distort the geometry of the object and thus result in a subpar model or perhaps no model at all. The object 301 in FIG. 3 is representative of the object as it would appear to a visible light camera. The pattern 303 that is shown on object 301 is representative of a thermal image of the object 301 that has had a thermal differential applied to it in a patterned manner. By utilizing this thermal pattern 303, object 301 can be accurately modelled through photogrammetric processes despite its highly reflective nature. FIG. 4 provides a more detailed overview, in flowchart format, of the process 400 involved in thermographic texturing for photogrammetric modeling image acquisition, as described in more detail herein. Thermographic texturing such as this can help to photogrammetrically model objects that are either highly reflective or transparent. Traditional photogrammetric modelling image acquisition techniques could not capture images of the object in sufficient detail to allow the photogrammetric modeling processes to detect surface points and discern the requisite geometry for the three-dimensional modeling.

In addition, visible light images can also be captured from the same perspective as the thermographic camera. These visible light images can then be overlaid onto the three-dimensional model created by thermal texturing to create a three-dimensional model that accurately shows the geometry of the model in addition to the appropriate coloring and texturing of the model. However, it is not necessary to overlay these visible light images as the model created by the thermographic texturing would be sufficient to capture the full geometry of the object. Thus, depending on the purpose intended for the three-dimensional model, visible light images may or may not be taken in conjunction with the thermographic images.

FIG. 4 is a flowchart illustrating an exemplary process 400 for utilizing thermographic texturing to acquire images for photogrammetric modeling. In step 401, an object is positioned. The object could be anything and of almost any size. In step 403, a thermographic camera and a visible light camera are positioned such that the object is in the field of view of both cameras and the cameras share a perspective. The goal of step 401 and step 403 is to place the object within the field of view of both cameras. The cameras may not necessarily be positioned at the same time, and the process may involve taking the thermographic images and then replacing the thermographic camera with the visible light camera or visa-versa. The thermographic camera can be any sort of thermographic camera known to one in the art that is able to measure the temperature of an object and output an image. The visible light camera is similar to camera 101 mentioned above, and as such, the camera could be any sort of visible light camera that can capture digital images.

In step 405, a temperature differential is applied to the object in a patterned manner. The temperature differential could be applied in any pattern. Perhaps the most common would be in a somewhat checkboard pattern. The key is to ensure that only selective portions of the object are warmer or cooler than other portions and that there is not simply one uniform temperature. In addition, the user should avoid applying a temperature differential that would result in the edges of the object having the same temperature as the background of the object. The temperature differential may also be applied through a variety of means. For example, the temperature differential may be applied using some physical means or non-physical means. An exemplary but non-limiting list of physical means of applying the temperature differential may include a warmed or cooled sponge, some other hot object, an ice cube, a freezer pack, a heating blanket, a hand, or other such means known to one in the art. An exemplary but non-limiting list of non-physical means of applying the temperature differential may include a spot light, laser array, a blow drier, a flame, a flash light, light bulb, the user's breath, or other such means known to one in the art.

In step 407, one or more thermographic images are captured of the thermal pattern on the object using the thermographic camera. These images provide the basic surface point information needed by the photogrammetric modeling software to create a three-dimensional model when combined with multiple perspectives. In step 409, a series of visible light images are captured of the object using the visible light camera and from the same perspective as the thermographic camera. These images, as discussed above, are optional, but when combined with the three-dimensional model created from the thermographic images allow for a three-dimensional model to be created that more accurately resembles not only the geometry of the object but also the coloring and texturing of the object. These visible light images could encompass the focus-stacking and high dynamic range methods discussed above and shown in FIG. 2 if necessary or desired to provide a more robust photogrammetric three-dimensional model. In step 411, the temperature differential is reapplied to the object as necessary throughout the process to maintain the same or similar thermal pattern. This helps to ensure that the photogrammetric modelling software can find the same control points in the different perspectives of the object to aid in the creation of the three-dimensional model. The control points aid the photogrammetric modelling software in finding the common points between perspectives to tie the perspectives together to help build a representative three-dimensional model. In step 413 the cameras or the object is repositioned to provide for a new perspective to be captured, and in step 415, the thermal pattern is reapplied, if needed. This above process is repeated in step 417 and 419 until thermographic images and, if desired, visible light images have been captured from all perspectives necessary to build a three-dimensional model of the object through photogrammetry.

Once all the images have been captured, the images are assembled together for each perspective in step 421. In step 423, the thermographic images are processed to create a thermal image mesh of the object. The mesh is used to provide the requisite data of the object's geometry for the photogrammetric three-dimensional modeling. In step 425, the visible light images that were captured may be overlaid onto the model created from the thermal mesh to give the model the appropriate coloring and texturing. This is not a necessary step but helps to produce a more accurate model. The overall process of using thermographic texturing allows for the photogrammetric modeling of highly reflective or transparent objects in an efficient and accurate manner; something not easily achievable under traditional photogrammetric image acquisition methods.

Figure 5:
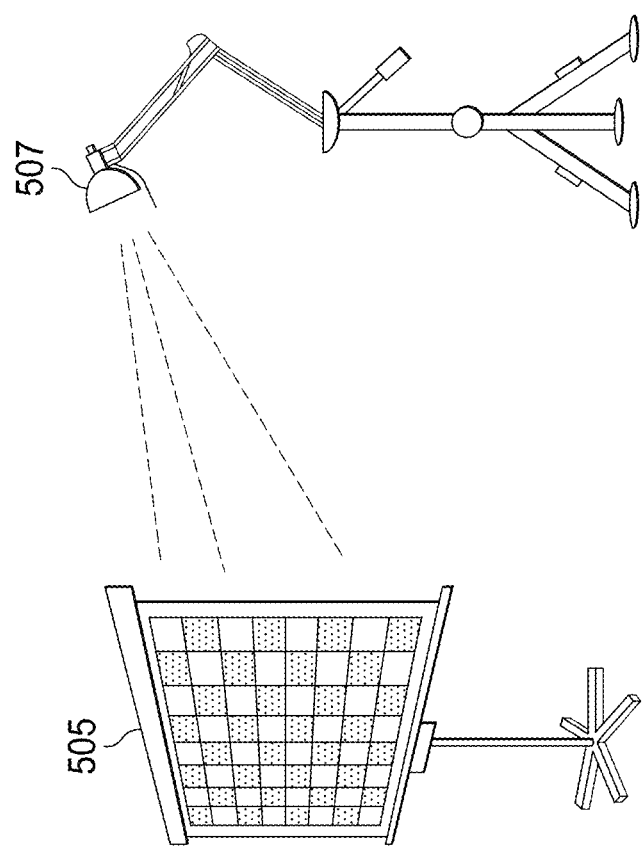
FIG. 5 illustrates an overview of an exemplary implementation of thermographic subject isolation wherein the temperature differential is applied to the background.
Figure 5:
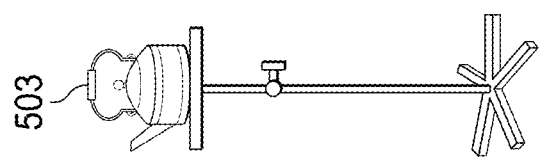
Figure 5:
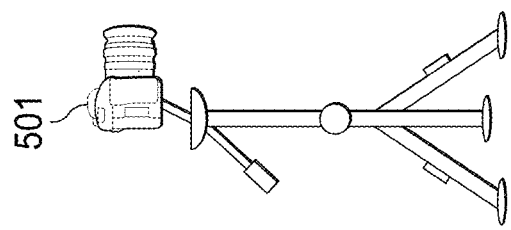

FIG. 5 illustrates an exemplary set up for utilizing thermographic subject isolation wherein a temperature differential exists by applying a temperature differential to the background. A camera 501 is positioned such that the object 503 is in the field of view of the camera 501. The camera 501 represents a thermographic camera and/or a visible light camera. The camera 501 will be switched as needed from being a thermographic camera to a visible light camera to capture the thermographic images and visible light images needed from the same perspective. It is possible to use both cameras at the same time, but in the present exemplary implementation, one camera is used and then the other. As mentioned above, the thermographic camera can be any sort of thermographic camera known to one in the art that is able to measure the temperature of an object and output an image. The visible light camera as mentioned above could be any sort of visible light camera that can capture digital images.

The object 503 in this exemplary implementation is a smaller object and FIG. 5 is more representative of a studio set up. However, the object 503 could be of any shape or size. Behind the object is a background 505. The background 505 is being warmed from behind by a heat source 507. As a result, the background 505 has a discernably different temperature than the object 503. Due to this temperature difference between the background 505 and the object 503, the captured thermographic images can be used to isolate the object 503 from the background 505 as further exemplified in FIG. 6 and FIG. 9. In performing this thermal subject isolation method, a temperature differential can exist on either the background as is shown in FIG. 5 or on the object as is shown in FIG. 7. The temperature differential may also be applied through a variety of means. For example, the temperature differential may be applied using some physical means or non-physical means. An exemplary but non-limiting list of physical means of applying the temperature differential may include a warmed or cooled sponge, some other hot object, an ice cube, a freezer pack, a heating blanket, a hand, or other such means known to one in the art. An exemplary but non-limiting list of non-physical means of applying the temperature differential may include a spot light, laser array, a blow dryer, a flame, a flash light, light bulb, the user's breath, or other such means known to one in the art. In addition, it is possible, as is shown in FIG. 7 for the temperature differential to exist naturally due to the nature of the object.

Figure 6:
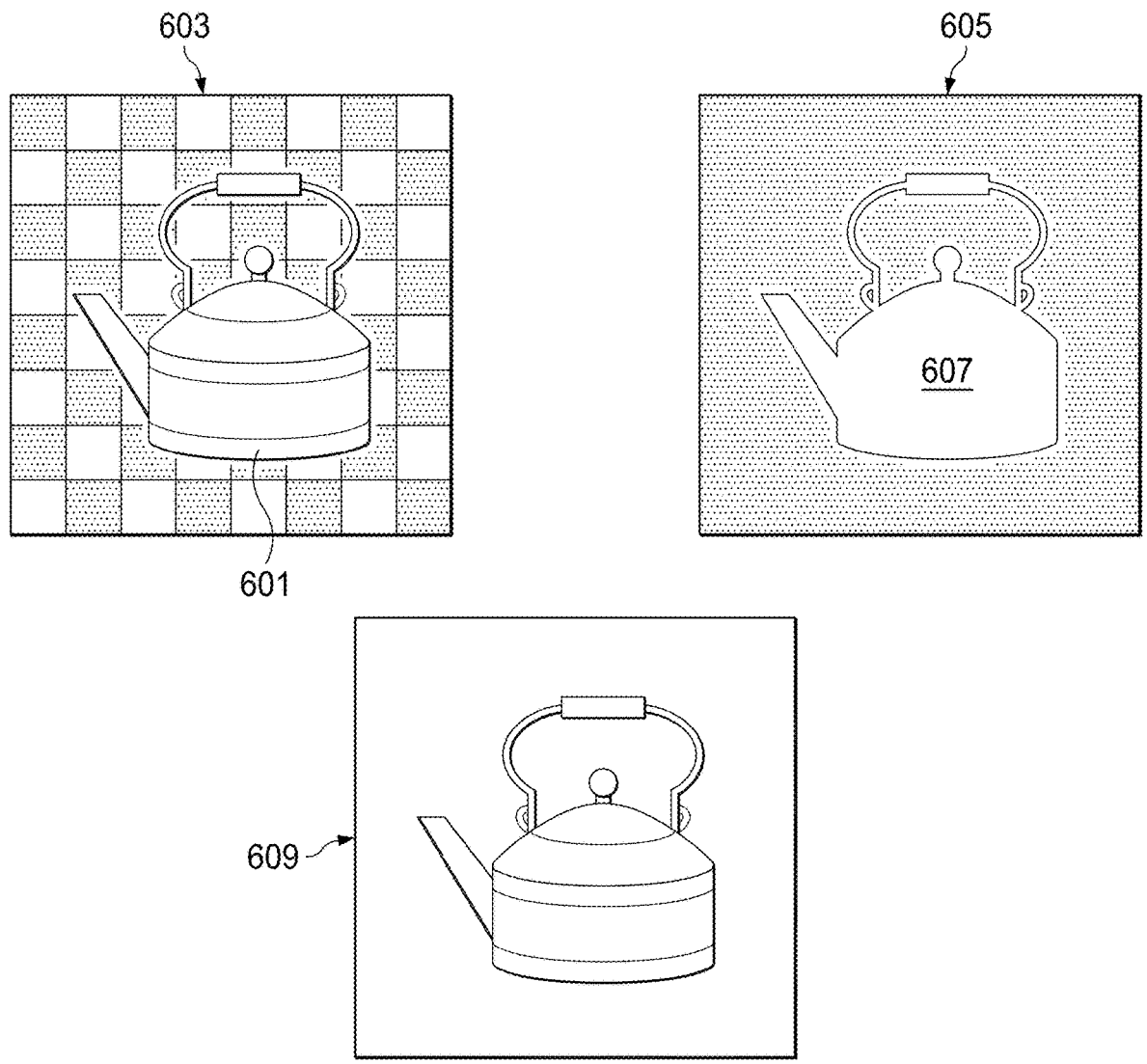
FIG. 6 illustrates an exemplary schematic illustration of the various images of the object from FIG. 5.
Figure 7:
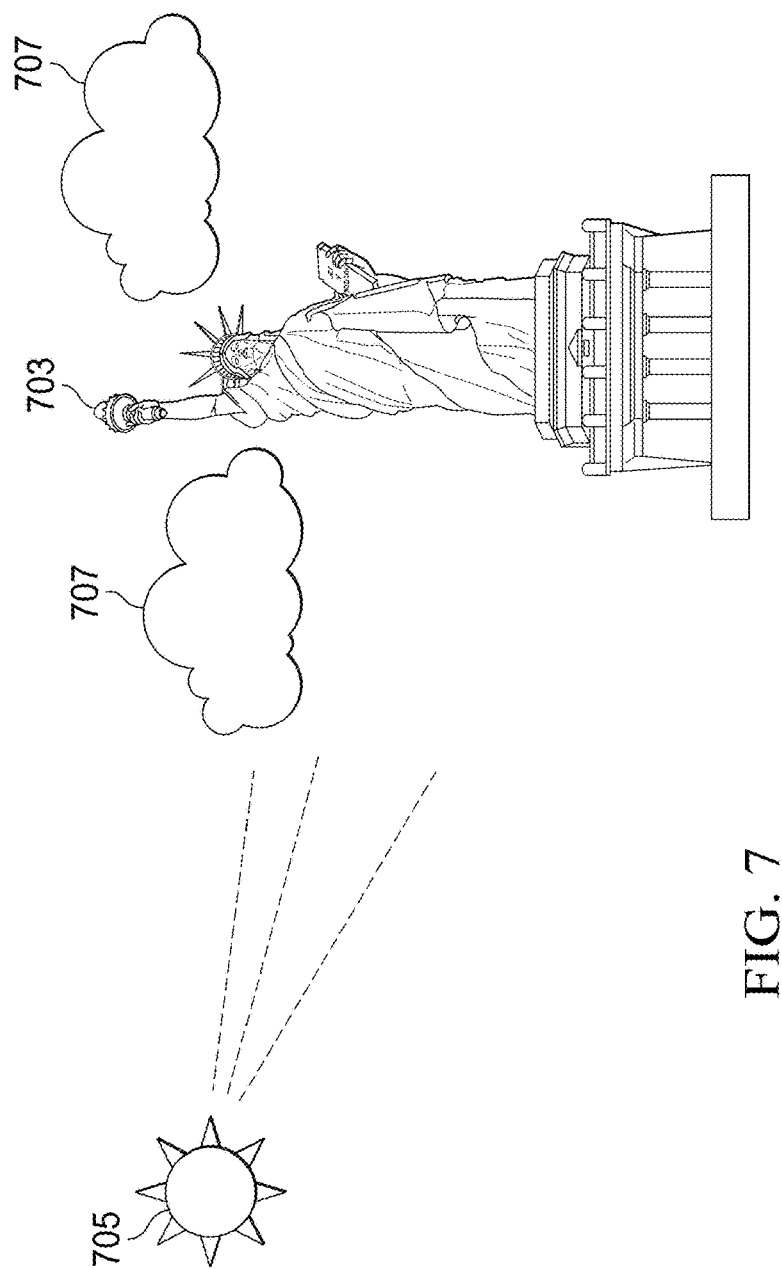
FIG. 7 illustrates an exemplary schematic illustration of thermographic subject isolation in which the temperature differential exists naturally.

FIG. 6 is an exemplary schematic illustration of various images of the object 503 of FIG. 5. FIG. 6 illustrates the visible light image of the object in the upper left, the thermal image of the object in the upper right, and the resulting combination and isolation of the object in the lower middle. The visible light image 601 of the object is hard to discern against the background image 603. However, on the thermographic image the thermographic representation of the background 605 and the thermographic representation of the object 607 are clearly distinguishable. The differential can then be used to create a thermal image mask of the object. This process is similar to that of chroma key isolation, however it utilizes temperature differentials instead of color differences. As such, the image mask is far more precise and exact. In addition, this method removes the issues of an object having the same color as the background, or of the object being highly reflective or transparent. When the thermal image mask from the thermographic camera is combined with the visible light image and processed, the result is the isolated subject image 609. This isolated subject image 609 thus shows the full detail of the object without the mess of the background. From this isolated subject image 609 a photogrammetric model can be created, which would not be hindered by non-applicable image data that may introduce anomalies in the model, if the object were not isolated. If modeling is desired, then the thermographic subject isolation may be performed at each perspective that is needed for the photogrammetric three-dimensional modeling.

FIG. 7 is another exemplary schematic illustration of thermographic subject isolation in which the temperature differential exists naturally due to the nature of the object. A camera 701 is shown positioned such that the object 703 is in the field of view of the camera 701. The camera 701 represents both a thermographic camera and a visible light camera. The camera 701 will be switched as needed from being a thermographic camera to a visible light camera to capture the thermographic images and visible light images needed from the same perspective. It is possible to use both cameras at the same time, but in the present exemplary implementation the one camera is used and then the other camera. As mentioned above, the thermographic camera can be any sort of thermographic camera known to one in the art that is able to measure the temperature of an object and output an image. The visible light camera as mentioned above could be any sort of visible light camera that can capture digital images.

The object 703 in this exemplary implementation is a larger object, such as the Statue of Liberty, as shown. However, the object 703 could be of any shape or size. Behind the object is a background 707, such as clouds in the sky. In this implementation the object 703 has a higher temperature than the background 707. The object has a higher temperature because it is being warmed by an external source 705, in this case the sun. Due to the fact that the object 703 is metallic and has been exposed to the external source 705, i.e. the sun, the object 703 is warmer than the background 707 behind it. As a result, the background 707 has a discernably different temperature than the object 703. Due to this temperature difference, the captured thermographic images can be used to isolate the object 703 from the background 707 as further exemplified in FIG. 8 and FIG. 9. In this implementation the temperature differential is naturally occurring, but the temperature differential may also be applied through a variety of means. For example, the temperature differential may be applied using various physical means or non-physical means as discussed above.

Figure 8:
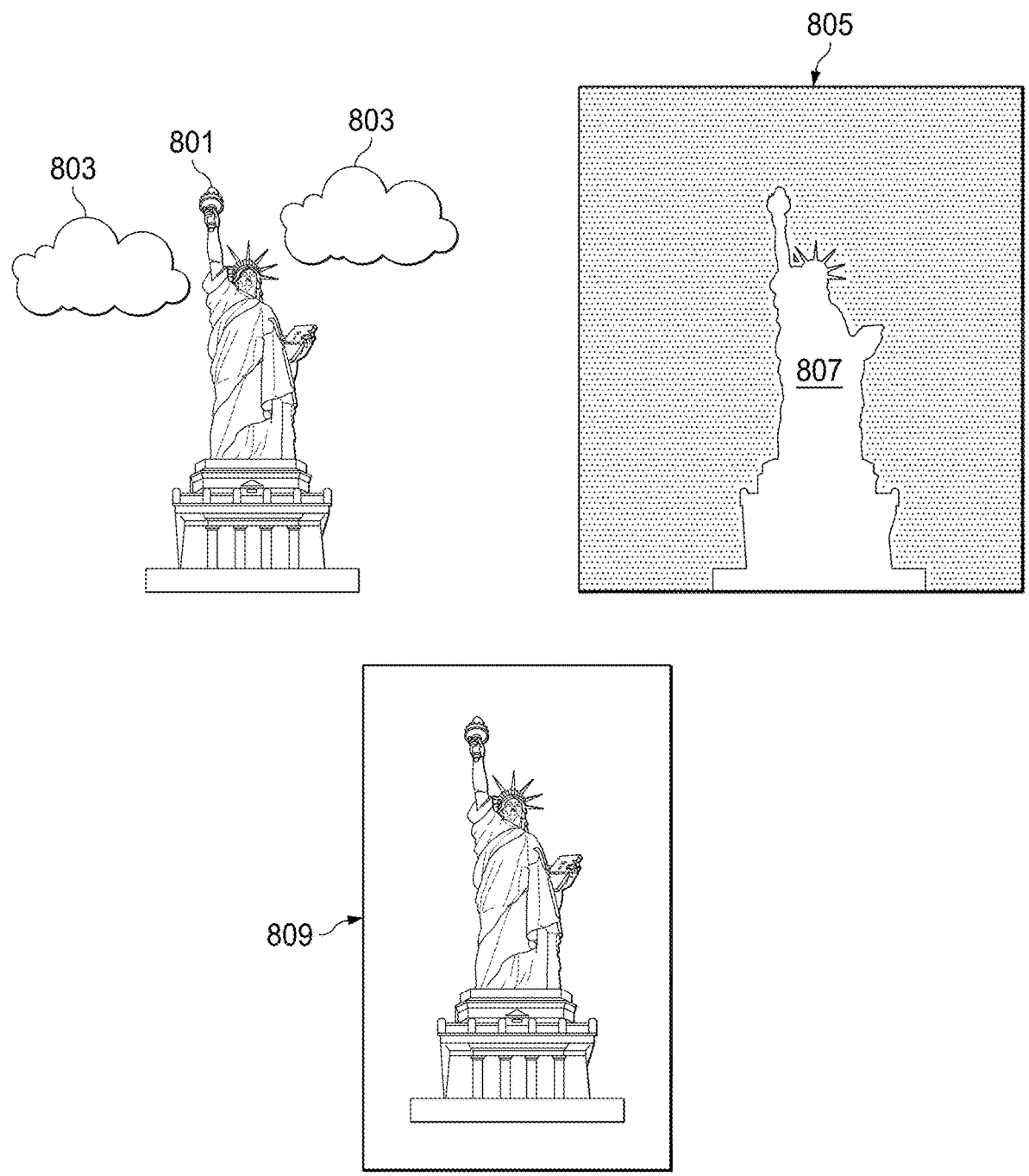
FIG. 8 illustrates an exemplary schematic illustration of the various images of the object from FIG. 7.

FIG. 8 is an exemplary schematic illustration of various images of the object 703 of FIG. 7. FIG. 8 illustrates the visible light image of the object in the upper left, the thermal image of the object in the upper right, and the resulting combination and isolation of the object in the lower middle. As can be seen, the visible light image of the object 801 is spoiled by the background 803. These background 803 artifacts could distort a resulting photogrammetric three-dimensional model by causing anomalies in the object. However, on the thermographic image the thermographic representation of the background 805 and the thermographic representation of the object 807 are clearly distinguishable. The differential can then be used to create a thermal image mask of the object. As discussed above with regard to FIG. 6, this process is similar to that of chroma key isolation, however it is far more precise and exact. In addition, as mentioned, this method removes the issues of an object having the same color as the background, or of the object being highly reflective or transparent. When the thermal image mask is combined with the visible light images and processed, the result is the isolated subject image 809. This image thus shows the full detail of the object 801 without the interference of the background 803.

Figure 9:
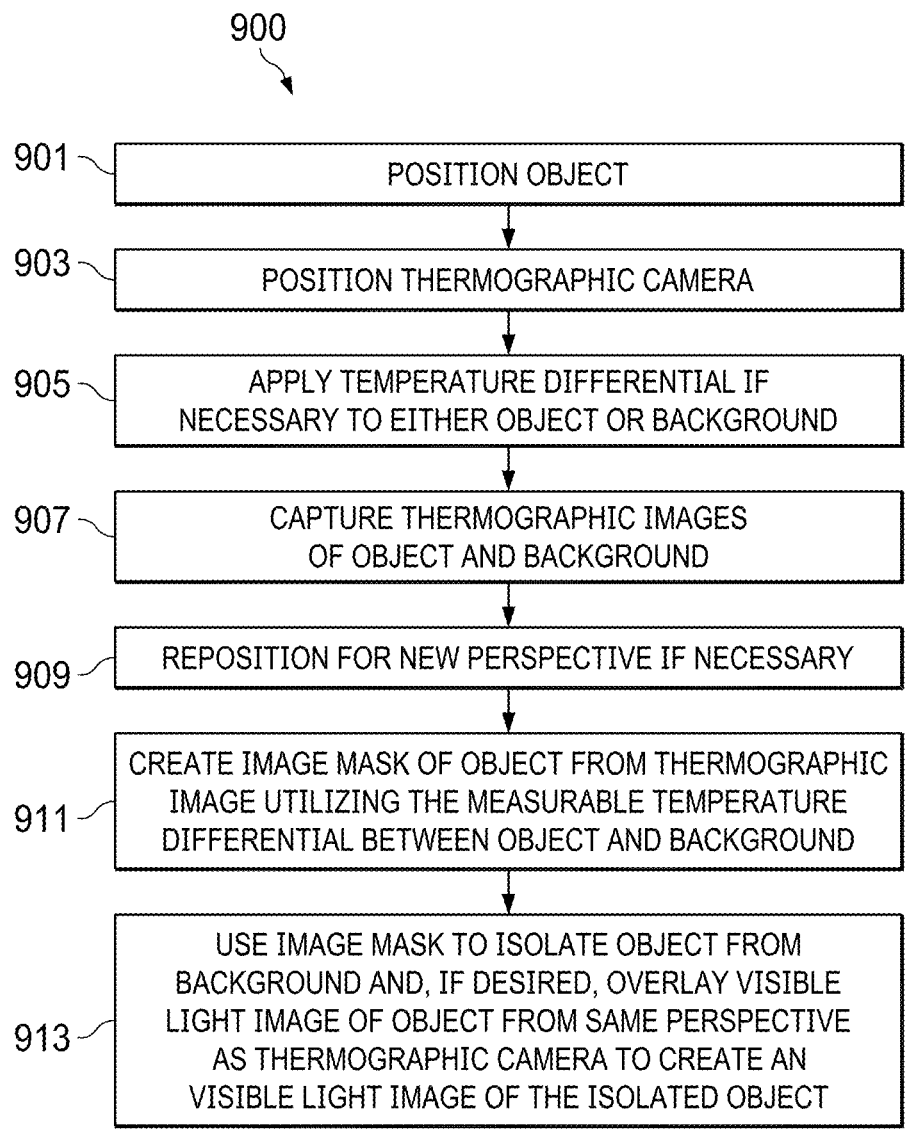
FIG. 9 is a flowchart of an exemplary process of implementing thermographic subject isolation.

FIG. 9 is a flowchart illustrating an exemplary process 900 of implementing thermographic subject isolation. In step 901, an object is positioned. The object could be anything and of almost any size. In step 903, a thermographic camera is positioned such that the object is in the field of view of the thermographic camera. The thermographic camera can be any sort of thermographic camera known to one in the art that is able to measure the temperature of an object and output an image. The goal of step 901 and step 903 is that the object is placed within the field of view of the thermographic camera. In step 905, a temperature differential is applied to either the object or the background. It may be the case that a temperature differential does not need to be applied since it naturally exists, as discussed in FIG. 7.

As discussed, the temperature differential may be applied through a variety of means. For example, the temperature differential may be applied using some physical means or non-physical means. An exemplary but non-limiting list of physical means of applying the temperature differential may include a warmed or cooled sponge, some other hot object, an ice cube, a freezer pack, a heating blanket, a hand, or other such means known to one in the art. An exemplary but non-limiting list of non-physical means of applying the temperature differential may include a spot light, laser array, a blow dryer, a flame, a flash light, light bulb, the user's breath, or other such means known to one in the art. The means utilized is not important so long as the result is that a discernable temperature differential exists between the object and the background. It is helpful in attaining this goal if the temperature differential is applied in a uniform manner, however it is not necessary.

In step 907, the thermographic camera is used to capture thermographic images of the object and the background. These thermographic images show the temperature differential between the object and the background to allow for thermal subject isolation to be performed. In step 909, the thermographic camera or the object is repositioned as needed if multiple perspectives of the isolated object are desired. For example, this step would be needed if this method is applied to photogrammetric modeling photo acquisition, since multiple perspectives are needed to create a full three-dimensional model. In step 911, an image mask is created of the object from the thermographic images by using the temperature differential.

Figure 10:
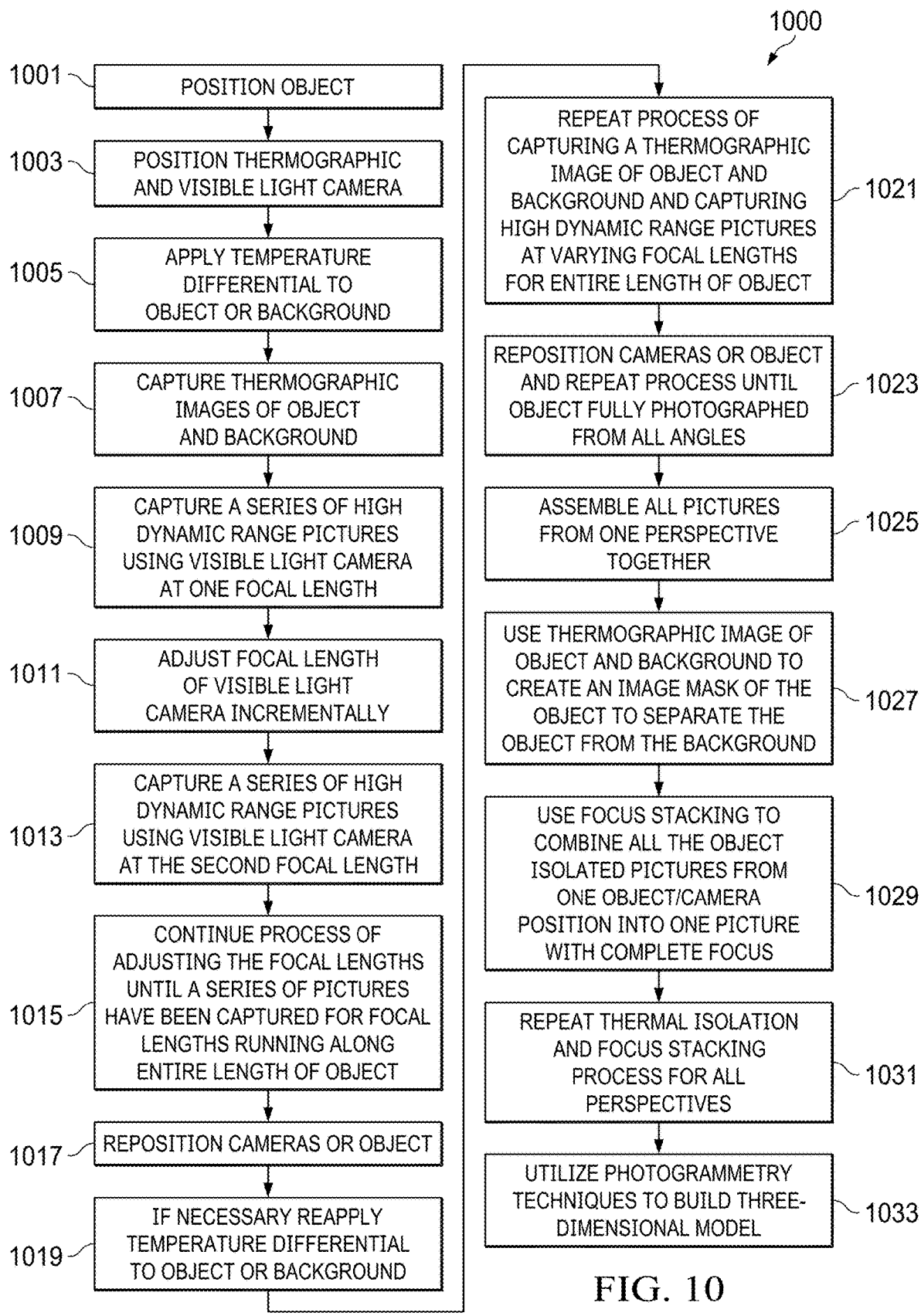
FIG. 10 is a flowchart of an exemplary process combining thermographic subject matter isolation with focus stacking and high dynamic range photography.

In step 913, the image mask is used to isolate the object from the background. The thermal image mask may then be overlaid on to visible light images of the object that were captured from the same perspectives as the thermographic images. Through this process a visible light image can be created of an isolated object as was shown in FIG. 6 and FIG. 8. As mentioned this process is similar to the way in which an image mask is created and used for chroma key isolation, however, this method is superior to chroma key isolation for the reasons explained above. This method can be combined with the above focus stacking or high dynamic range photography methods disclosed in FIG. 2. Doing so would create an isolated object with more complete focus and a wider range of luminosity as compared to traditional methods. Thus, the resulting photogrammetric model should be more detailed and accurate than a model using traditional photogrammetric image acquisition methods because the model created using this new method of photogrammetric image acquisition has more complete data. FIG. 10 provides an exemplary flowchart for how the combination of these methods would work.

FIG. 10 is a flowchart illustrating an exemplary process 1000 combining thermographic subject matter isolation with focus stacking and high dynamic range photography to create an improved series of images for use in photogrammetric modeling. In step 1001, an object is positioned. The object could be anything and of almost any size. In step 1003, a thermographic camera and a visible light camera are positioned such that the object is in the field of view of the cameras and the cameras share a perspective. As was the case above, the goal of step 1001 and step 1003 is that the object is placed within the field of view of the cameras. The cameras may not necessarily be positioned at the same time, and the process may involve taking the thermographic images and then replacing the thermographic camera with the visible light camera or visa-versa. The thermographic camera can be any sort of thermographic camera known to one in the art and the visible light camera, as mentioned above, could be any sort of visible light camera that can capture digital images.

In step 1005, a temperature differential is applied to either the object or the background. It may be the case that a temperature differential does not need to be applied since it naturally exists, as was shown and discussed in FIG. 7. As discussed in FIG. 9, the temperature differential may be applied through a variety of physical or non-physical means. The means utilized is not important so long as the result is a discernable temperature differential between the object and the background.

In step 1007, the thermographic camera is used to capture thermographic images of the object and the background. These thermographic images will show the temperature differential between the object and the background to allow for thermal subject isolation to be performed. In step 1009, a series of images are captured by the visible light camera at a first focal length, which generally would be located at one end of the object. The images in step 1009 may be high dynamic range images, meaning that a series of images are captured at various exposure settings at that first focal length. Although high dynamic range photographs are not necessary, they are useful when the coloring of the object would result in either exceedingly bright or dark portions that would skew the resulting photogrammetric model. In step 1011, the focus length of the visible light camera is adjusted incrementally towards an end of the object. At this second focal length, in step 1013, a new series of visible light photos are taken. Again, in this exemplary implementation the photographs may be high dynamic range photos, but this is not required. The process of incrementally changing the focus length and taking a series of photos is repeated in step 1015 until photos have been captured along the entire length of the object. The goal is to end with a series of images that when taken as a whole have the object more focused and, if desired, with a larger range of luminosity (compared to traditional methods) for a given perspective.

In step 1017, the cameras or the object is repositioned so as to allow the capturing of a new perspective of the object. In step 1019, the temperature differential is reapplied as necessary to ensure the thermal subject isolation method performs well. From this new perspective, in step 1021, the above process of capturing thermographic images of the object and background, as well as taking photos at varying focal lengths is repeated. In step 1023, the cameras or the object are repositioned and the process is repeated for all the necessary perspectives until a multitude of thermographic images and of visible light images have been captured at all necessary perspectives, focal lengths, and exposure settings to fully photograph the object from all angles.

In step 1025, the batch of images of the object for a given perspective are assembled together. In step 1027, the thermographic images are used to create an image mask of the object utilizing the temperature difference between the object and the background. The image mask can then be utilized to isolate the object from the background in all the images for the same perspective. The isolation step could occur here, or it could occur after the focus stacking and high dynamic photography methods have been implemented. In step 1029, focus stacking (as discussed above) is utilized to combine all the images of a given perspective. The result of the focus stacking is a singular image that is more in focus along its entire depth as compared to traditional photographic image acquisition without focus stacking. With the addition of the high dynamic range photography, the image also has a wider range of luminosity values. As such the resulting image from this perspective not only has a wider luminosity range and a more complete focus, as compared to traditional methods, but it is also isolated from the background. The thermal subject isolation and focus stacking process is then repeated for the remaining perspectives in step 1031. Once this step is complete a series of images should remain of an isolated object with a more complete focus and wider luminosity range. Thus, in step 1033, photogrammetry techniques are utilized to build a three-dimensional model from these images. Due to the processes utilized, this model will be highly detailed and more accurate regardless of the size, shape, transparency, reflectiveness, or color of the object or background. Thus, this method helps to overcome many of the current difficulties in photogrammetric image acquisition.

Any of the above methods can be utilized separately or in combination (as disclosed in FIG. 10), but all aid in the acquisition of images for photogrammetry and help to provide the photogrammetric modeling software the improved images from which to create three-dimensional models.

The above is a detailed description of exemplary implementations to illustrate the principles of the disclosure. The implementations are provided to illustrate aspects of the disclosure, but the disclosure is not limited to any embodiment. In addition, for the purpose of clarity, technical material that is known in the technical fields related to the disclosure has not been described in detail so that the disclosure is not unnecessarily obscured.

What is claimed is:

1. A method of acquiring images for photogrammetry, comprising:
    (a) positioning an object in a field of view of a camera to capture two-dimensional photographic images of the object from a first perspective;
    (b) setting a focal length of the camera on one end of the object;
    (c) capturing one or more images of the object at the focal length utilizing the camera;
    (d) incrementally adjusting the focal length of the camera toward an opposite end of the object and capturing one or more images of the object at each incremental focal length until the focal length reaches the opposite end of the object;
    (e) repositioning the object or the camera for capturing two-dimensional photographic images from a second perspective of the object;

(f) capturing one or more images of the object from the second perspective by setting a first focal length of the camera on one end of the object, capturing one or more images of the object, incrementally adjusting the focal length towards the other end of the object, and capturing one or more images at each incremental focal length until the focal length reaches the opposite end of the object;

(g) repeating steps (e) and (f) until one or more images of the object have been captured at each of a plurality of perspectives and focal lengths to provide a comprehensive set of images representing the object in entirety; and (h) generating a focused image of the object from each of the plurality of perspectives utilizing focus stacking.

2. The method of claim 1, wherein a plurality of images is captured at each of the plurality of perspectives; and
wherein at least two of the plurality of images at each of the plurality of perspectives are captured at different exposures; and
wherein the plurality of images at each of the plurality of perspectives are combined to generate an image of the object at each perspective and focal length having a greater range of luminosity.

3. The method of claim 2, wherein the at least two of the plurality of images at different exposures are captured through the use of a camera having high dynamic range capabilities.

4. The method of claim 3, further comprising:
using photogrammetric modelling to create a three-dimensional model of the object using the focused images of the object from each of the plurality of perspectives generated utilizing focus stacking.

5. The method of claim 2, further comprising:
using photogrammetric modelling to create a three-dimensional model of the object using the focused images of the object from each of the plurality of perspectives generated utilizing focus stacking.

6. The method of claim 1, wherein the object is positioned in front of a background with a different color than the object to allow for the object to be isolated from the background through the use of chroma key compositing.

7. The method of claim of claim 1, further comprising:
capturing thermographic images of the object at each of the plurality of perspectives and each focal point using a thermographic camera; and
isolating the object from a background in each thermographic image by using a temperature differential between the background and the object.

8. The method of claim 7, wherein the temperature differential is created and maintained throughout the thermographic image captures by heating or cooling either the object or the background.

9. The method of claim 8, wherein the temperature differential is created by a projected beam of light.

10. The method of claim 8, wherein the temperature differential is applied by a physical means.

11. The method of claim 8, wherein the temperature differential is applied by a non-physical means.

12. The method of claim 7, further comprising:
creating a thermographic mesh from the thermographic images; and
projecting a texturing from the two-dimensional photographic images on to the thermographic mesh.

13. The method of claim 7:
wherein the camera is replaced by the thermographic camera after the camera captures the two-dimensional photographic images of the object at each of the plurality of perspectives and each focal point.

14. The method of claim 7:
wherein the thermographic camera is replaced by the camera after the thermographic camera captures the thermographic images of the object at each of the plurality of perspectives and at each focal point.

15. The method of claim 7:
wherein the camera and the thermographic camera are positioned to enable simultaneous capturing of the two-dimensional photographic images and the thermographic images of the object at each of the plurality of perspectives and each focal point.

16. The method of claim 7, further comprising:
using photogrammetric modelling to generate a three-dimensional model of the object using the captured thermographic images of the object at each of the plurality of perspectives and each focal point; and
using photogrammetric modelling to create a more accurate three-dimensional model of the object by combining the generated three-dimensional model with the focused images of the object from each of the plurality of perspectives generated utilizing focus stacking.

17. The method of claim 1, wherein the object is a micro-scale object.

18. The method of claim 1, wherein the object is a macro-scale object.

19. The method of claim 1, wherein the camera is a visible light camera.

20. The method of claim 1, further comprising:
using photogrammetric modelling to create a three-dimensional model of the object using the focused images of the object from each of the plurality of perspectives generated utilizing focus stacking.

* * * * *